(12) United States Patent
Tippmann, Sr.

(10) Patent No.: US 6,721,996 B2
(45) Date of Patent: Apr. 20, 2004

(54) REMOVABLE HANDLE FOR PANS

(76) Inventor: Vincent P. Tippmann, Sr., 4410 New Haven Ave., Fort Wayne, IN (US) 46803

( * ) Notice: Subject to any disclaimer, the term of this patent is extended or adjusted under 35 U.S.C. 154(b) by 0 days.

(21) Appl. No.: 10/216,871

(22) Filed: Aug. 13, 2002

(65) Prior Publication Data

US 2003/0029879 A1 Feb. 13, 2003

Related U.S. Application Data

(60) Provisional application No. 60/311,349, filed on Aug. 13, 2001.

(51) Int. Cl.$^7$ ............................ A47J 45/00; A45C 13/22
(52) U.S. Cl. ............................ 16/425; 16/422; 294/31.2
(58) Field of Search ................... 16/425, 422, 443, 16/444, 446; 294/29, 33, 34, 31.1, 31.2; 220/759, 760, 757, 758, 752

(56) References Cited

U.S. PATENT DOCUMENTS

| | | | | |
|---|---|---|---|---|
| 1,555,533 A | * | 9/1925 | Vance | 220/548 |
| 1,950,378 A | * | 3/1934 | Anderws | 210/470 |
| 3,088,767 A | * | 5/1963 | Deal | 294/31.2 |
| 4,116,374 A | * | 9/1978 | Garello | 294/150 |
| 4,333,599 A | * | 6/1982 | Stemen | 229/5.7 |
| 4,795,202 A | * | 1/1989 | Mader | 294/16 |
| 4,921,119 A | * | 5/1990 | Goad et al. | 220/212 |
| 5,511,467 A | * | 4/1996 | Motley et al. | 99/426 |
| 6,065,788 A | * | 5/2000 | Brady | 294/31.2 |
| 6,241,415 B1 | * | 6/2001 | Stark | 403/17 |

FOREIGN PATENT DOCUMENTS

| | | | |
|---|---|---|---|
| CH | 688511 A5 | * | 10/1997 |
| JP | 9-327394 | * | 12/1997 |

* cited by examiner

Primary Examiner—Chuck Y. Mah
(74) Attorney, Agent, or Firm—Birch, Stewart, Kolasch & Birch, LLP

(57) ABSTRACT

A handle for a container includes a retaining portion for securing between a mounting band and an outer peripheral surface of the container. A holding portion extends from the retaining portion. A gripping portion extends from the holding portion. Wherein positioning the mounting band relative to an outer peripheral surface of a container and wedging the mounting band relative thereto secures the retaining portion of the handle relative to the container and permits a user to hold the holding portion and grip the gripping portion during use of the handle.

19 Claims, 1 Drawing Sheet

REMOVABLE HANDLE FOR PANS

CROSS-REFERENCE TO RELATED APPLICATIONS

The present application claims priority under 35 USC 120 to U.S. Provisional Patent Application No. 60/311,349 filed on Aug. 13, 2001, the entire contents thereof is hereby incorporated by reference.

BACKGROUND OF THE INVENTION

1. Field of the Invention

The present invention relates to a removable handle for use with a container that is typically used in the foodservice and restaurant industry

2. Description of Background Art

Heretofore, containers that are used in the foodservice and restaurant industry required a metal or plastic handle that is secured to the container by drilling holes in the container and using bolts and/or screws to mount the handles on the pan. The metal or plastic handles have to be constructed to be of a predetermined size to fit a particular container. In addition, the drilling of holes into the containers raises concerns from a sanitary standpoint.

SUMMARY AND OBJECTS OF THE INVENTION

It is an object of the present invention to provide handles for a container that are easily mounted on a container by means of a band that is slightly larger than the outer peripheral surface of the container. The band is wedged onto the outer peripheral surface of the container to hold the handles relative thereto.

Another object of the present invention is to provide handles for a container that are capable of being removed from one container and installed on another container for changing the handles when required.

These and other objects of the invention are achieved by providing a handle for a container wherein the handle includes a bracket for insertion between a band and an outer peripheral surface of the container for retaining the handle relative to the container during use and for permitting selective removal of the handle from the container.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
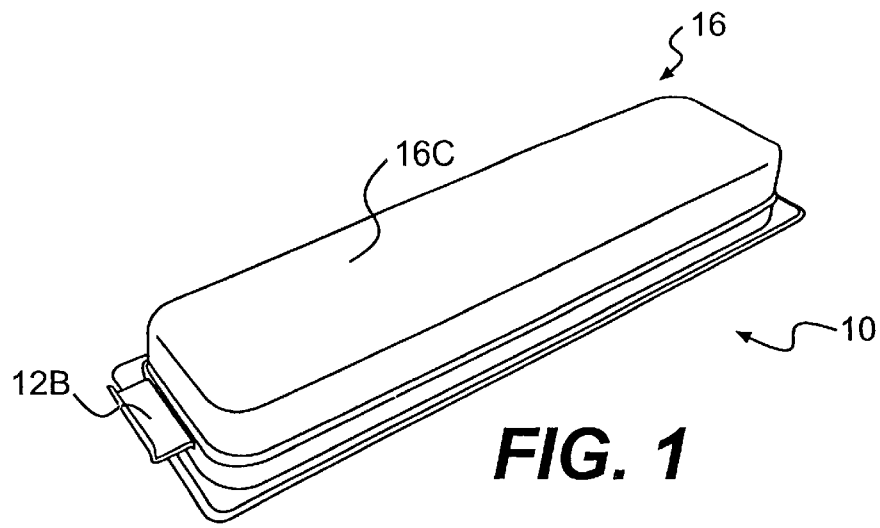
FIG. 1 is a perspective view of a bottom of a container illustrating the handle being mounted relative thereto.
Figure 2:
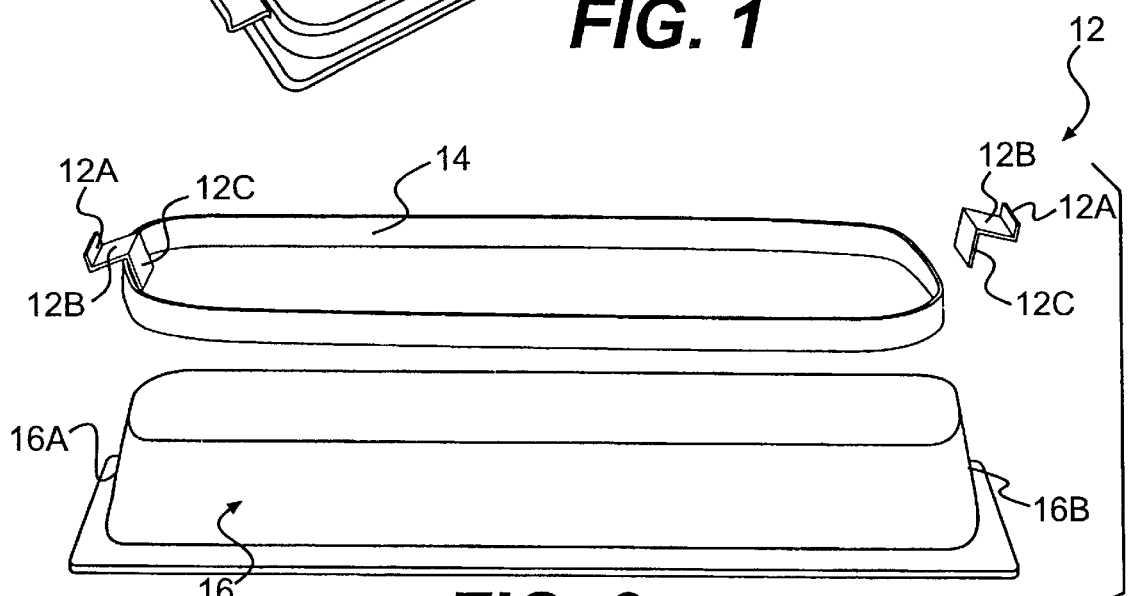
FIG. 2 is an exploded view of the handles, a mounting band and a bottom of a container illustrating the order of the elements prior to the mounting band being wedged onto the bottom of the container.
Figure 3:
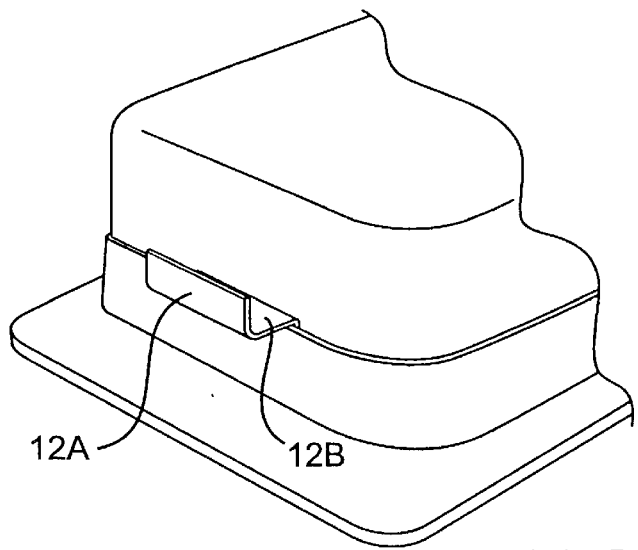
FIG. 3 is a partial cutaway enlarged view of the handle mounted on the container.

As illustrated in FIGS. 1–3, a container unit 10 includes a container 16, a handle 12 and a mounting band 14. The handle 12 includes a retaining portion 12C that is secured between the mounting band 14 and outer peripheral surfaces 16A, 16B of the container 16. A holding portion 12B extends from the retaining portion 12C and a gripping portion 12A extends from the holding portion 12B.

The present invention permits a user to quickly mount handles onto a container 16 by positioning the mounting band 14 relative to the bottom 16C of the container 16. The mounting band 14 is wedged onto the bottom 16C to provide a tight fit between the mounting band 14 and the outer peripheral surfaces 16A and 16B. The handles 12 are secured between the mounting band 14 and the outer peripheral surfaces 16A, 16B of the container 16. As the handles 12 are wedged between the container 16 and the mounting band 14, the handles 12 are forced therebetween to tighten the mounting band 14 relative to the container 16. The mounting band 14 may be constructed of plastic or metal or any material that is suitable for the intended purpose.

The handle 12 can be quickly installed or detached relative to a container 16. The handle 12 is not permanently mounted relative to the container 16. In addition, the handle 12 may be a separate element that is wedged between the mounting band 14 and the container 16. In the alternative, the handle 12 may be secured to the mounting band 14 for installation onto a container 16 as a unit.

In one embodiment of the present invention, the mounting band 14 may be installed on the container 16 during normal use of the container. When it is desired to use handles, the handles 12 are wedged between the mounting band 14 and the container 16. The handles 12 may be easily removed when it is desired to use the container 16 together with a steam table, wells or any type of application where a handle is not required.

The removable handles 12 may be used on all sizes and shapes of restaurant and foodservice pans such as round pans, soup pans, kettle type pans, square pans, long pans, deep pans, shallow pans, etc. Since it is not necessary to drill holes into the pans, the handles can be easily switched and are sanitary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handle for a container comprising:
   a mounting band formed as a continuous loop for positioning on an outer peripheral surface of a container, the outer peripheral surface of the container being tapered inwardly from a top to a bottom of the container, the inside dimensions of the mounting band being greater than outside dimensions of the outer peripheral surface at the bottom of the container, and being less than or equal to the outside dimensions of the outer peripheral surface at the top of the container;
   said handle including:
      a retaining portion for securing between the mounting band and an outer peripheral surface of a container;

a holding portion extending from the retaining portion; and a gripping portion extending from the holding portion;

wherein positioning the mounting band relative to an outer peripheral surface of a container and wedging the mounting band relative thereto secures the retaining portion of the handle relative to the container and permits a user to hold the holding portion and grip the gripping portion during use of the handle.

2. The handle for a container according to claim 1, wherein said retaining portion extends approximately ninety degrees relative to the holding portion.

3. The handle for a container according to claim 2, wherein the gripping portion extends approximately ninety degrees relative to the holding portion.

4. The handle for a container according to claim 1, wherein said mounting band includes a predetermined width and the retaining portion includes a predetermined length wherein the predetermined length of said retaining portion is substantially equal to the predetermined width of said retaining portion.

5. The handle for a container according to claim 4, wherein the retaining portion is substantially flat for mating with an outer peripheral surface of a container.

6. The handle for a container according to claim 1, wherein the holding portion extends a predetermined distance from the retaining portion for enabling an individual to readily grasp the holding portion during use.

7. The handle for a container according to claim 1, wherein the gripping portion extends a predetermined distance from the holding portion and is disposed at an angle relative thereto for enabling an individual to grasp the holding portion and grip the gripping portion during use.

8. The handle for a container according to claim 1, wherein the retaining portion, holding portion and gripping portion are of a substantially equal width dimension for forming a unitary handle.

9. The handle for a container according to claim 1, wherein the holding portion of the handle is disposed under the mounting band, and the gripping portion projects downwardly therefrom.

10. A kit for permitting a handle to be attached to a container comprising:

a mounting band adapted to be positioned on an outer peripheral surface of a container, the mounting band having an inner surface with a fixed length which is smaller than or equal to a peripheral length of the outer peripheral surface of the container near a top of the container; and a handle adapted to be positioned between the mounting band and an outer peripheral surface of a container, said handle including a retaining portion adapted to be secured between the mounting band and an outer peripheral surface of a container, a holding portion extending from the retaining portion and a gripping portion extending from the holding portion;

wherein an operation to move the mounting band upwardly from a bottom of the container over the outer peripheral surface of the container until the mounting band wedges against the outer peripheral surface of the container near a top of the container acts to secure the mounting band and the retaining portion of the handle relative to the container and permits a user to hold the holding portion and grip the gripping portion during use of the handle.

11. The kit for permitting a handle to be attached to a container according to claim 10, wherein said retaining portion extends approximately ninety degrees relative to the holding portion.

12. The kit for permitting a handle to be attached to a container according to claim 11, wherein the gripping portion extends approximately ninety degrees relative to the holding portion.

13. The kit for permitting a handle to be attached to a container according to claim 10, wherein said mounting band includes a predetermined width and the retaining portion includes a predetermined length wherein the predetermined length of said retaining portion is substantially equal to the predetermined width of said retaining portion.

14. The kit for permitting a handle to be attached to a container according to claim 13, wherein the retaining portion is substantially flat for mating with an outer peripheral surface of a container.

15. The kit for permitting a handle to be attached to a container according to claim 10, wherein the holding portion extends a predetermined distance from the retaining portion for enabling an individual to readily grasp the holding portion during use.

16. The kit for permitting a handle to be attached to a container according to claim 10, wherein the gripping portion extends a predetermined distance from the holding portion and is disposed at an angle relative thereto for enabling an individual to grasp the holding portion and grip the gripping portion during use.

17. The kit for permitting a handle to be attached to a container according to claim 10, wherein the retaining portion, holding portion and gripping portion are of a substantially equal width dimension for forming a unitary handle.

18. The kit for permitting a handle to be attached to a container according to claim 10, wherein the holding portion of the handle is disposed under the mounting band, and the gripping portion projects downwardly therefrom.

19. A handle for a container comprising:

a mounting band having a fixed length for tightly fitting around an outer peripheral surface of a container;

said handle including:

a retaining portion for securing between the mounting band and an outer peripheral surface of a container;

a holding portion extending from the retaining portion; and a gripping portion extending from the holding portion;

wherein positioning the mounting band relative to the outer peripheral surface of the container and wedging the mounting band upwardly relative thereto secures the retaining portion of the handle relative to the container and permits a user to hold the holding portion and grip the gripping portion during use of the handle.

* * * * *